(12) United States Patent
Rao

(10) Patent No.: US 8,781,440 B2
(45) Date of Patent: Jul. 15, 2014

(54) REAL TIME CHARGING MECHANISM TO DELIVER ON DEMAND TELECOMMUNICATION SERVICES

(71) Applicant: Balaga Sekhar Rao, Bangalore (IN)

(72) Inventor: Balaga Sekhar Rao, Bangalore (IN)

( * ) Notice: Subject to any disclaimer, the term of this patent is extended or adjusted under 35 U.S.C. 154(b) by 5 days.

(21) Appl. No.: 13/668,319

(22) Filed: Nov. 5, 2012

(65) Prior Publication Data

US 2013/0183930 A1 Jul. 18, 2013

(51) Int. Cl.
*H04W 4/26* (2009.01)
(52) U.S. Cl.
USPC .......................................... 455/406; 455/405
(58) Field of Classification Search
USPC ........................... 455/405, 406, 407, 408, 428
See application file for complete search history.

(56) References Cited

U.S. PATENT DOCUMENTS

2004/0048599 A1* 3/2004 Kotaluoto et al. ............ 455/405

* cited by examiner

*Primary Examiner* — Sam Bhattacharya

(57) ABSTRACT

The method and system for charging a user in real time to deliver On demand telecommunication services is disclosed. The method provides premium services like voice message services, content services and so on to the subscribers on their request and deducts an appropriate amount of charge instantly before providing the service. The method of deducting the charge and providing the requested service to the user happens while the call is still connected. The method of charging is applicable in either same network or in a different network that provides the premium services. Further, the method in the disclosed embodiment resides on a server that controls the charge deduction through any suitable network protocols. The charging server acts as a central entity where a group of merchants, content providers, value added service providers are connected to it and delivers services to the user depending on their requirement.

24 Claims, 7 Drawing Sheets

REAL TIME CHARGING MECHANISM TO DELIVER ON DEMAND TELECOMMUNICATION SERVICES

This application claims priority from Indian application 3109/CHE/2012 titled "A Real Time Charging Mechanism to deliver on demand telecommunication services" filed on Jul. 30, 2012

TECHNICAL FIELD

The embodiments herein relate to telecommunication services and implementations, and specifically relates to a method and system for charging a user in real time to deliver On demand telecommunication services.

BACKGROUND

With the recent advancements in technology, there is a growing demand for telecommunication services. In particular telecommunication service providers are much interested in providing quality and value added services to its subscribers. Further, premium services (for example premium services like news alerts, astrology services, voice messages, voice mail and so on) from telecommunication service providers are vital sources of income to the service providers.

In one existing system for providing premium services, in particular voice short message service (SMS) to the subscribers involves the following process as described herein. When a user of a mobile device attempts to call in order to access a particular service, the call will be redirected to the mobile network operator of the calling party and then it will reach the corresponding network operator of the called party and finally to the called party. In case if the called party is found in any of the instances, (for example unavailable, busy and unreachable) the call will be forwarded to a server that generates a voice to the calling party stating that the voice message can be sent to the called party. The user has to make a new call to avail the voice message service, and then a premium charge will be deducted from the user's account and a voice message will be sent to the called party.

In the above mentioned system, the calling party has to terminate the call, if the called party is found unavailable, busy, out of range and unreachable. Further, the calling party has to make a new call in order to avail the voice message to get connected with the called party. This is a tedious process and may not be efficient in real time scenarios. In the existing system, there is no mechanism to charge the premium to the subscriber instantly to provide the service when subscriber needs it On demand. Further, there is no mechanism in the existing system where charge deduction for the service happens on the call. Therefore there is a need for a mechanism to charge the premium to the subscriber instantly on the existing call to deliver On demand and premium services to the subscriber.

SUMMARY

In view of the foregoing, an embodiment herein provides a method of charging a user in real-time for delivery of on-demand telecommunication services within a communication network to which the user belongs, wherein the method comprises redirecting the service request to a solution server by a MSC (Mobile Switching Center) or Network Node, on MSC or Network Node receiving a service request from the user, wherein the solution server provides an announcement regarding the services sending service charging request by the solution server to a charging server, on solution server receiving confirmation from the user for the requested service in response to the announcement sending charge number corresponding to the requested service by the charging server to the MSC or Network Node deducting charge corresponding to the charge number by the MSC or Network Node from account of the user; and delivering the requested service to the user by the solution server, on charging server completing charge deduction.

Also, disclosed herein is a method of charging a user in real-time for delivery of on-demand telecommunication services between a first communication network to which the user belongs and a second communication network, wherein the method comprises receiving a service request from the user by a first MSC (Mobile Switching Center) or first Network Node belonging to the first communication network of the user; redirecting the service request to a second MSC or second Network Node belonging to the second communication network by the first MSC or first Network Node; redirecting the service request to a solution server by the second MSC or second Network Node, wherein the solution server provides an announcement regarding the services; sending service charging request by the solution server to a charging server, on solution server receiving confirmation from the user for requested service in response to the announcement; sending charge number corresponding to the requested service by said charging server to first MSC or first Network Node; deducting charge corresponding to the charge number by the first MSC or first Network Node from account of the user; and delivering the requested service to the user by the solution server, on charging server completing the charge deduction.

Disclosed herein is a method of charging a user in real time by a merchant for delivery of a service using a communication network, wherein the method comprises: redirecting the request to a solution server by the merchant server through at least one of an application on mobile, Signaling, Wireless Application Protocol (WAP), Web, HTTP, HTTPS, Internet Protocol (TCP/IP), premium SMS and Unstructured Supplementary Service Data (USSD), IVR (Interactive Voice Response), Any Telecommunication Media, Internet Media and so on, on receiving the request from the user for charging a service through an operator; redirecting service charging request by the solution server to a charging server, on said solution server identifying the details of the user for the requested service sending charge number corresponding to the requested service to the MSC or Network Node of the user of operator by the charging server; deducting charge corresponding to the charge number by the MSC or Network Node from account of the user of the operator; and delivering the requested service to the user by the merchant server, on merchant server receiving a confirmation from the charging server that the MSC or Network Node has deducted the charge.

Disclosed herein is a system for charging a user in real-time for delivery of on-demand telecommunication services within a communication network to which the user belongs, the system configured for redirecting the service request to a solution server using a MSC (Mobile Switching Center) or Network Node, on MSC or Network Node receiving a service request from the user, wherein the solution server provides an announcement regarding the services; sending service charging request using the solution server to a charging server, on solution server receiving confirmation from the user for the requested service in response to the announcement; sending charge number corresponding to the requested service using the charging server to the mobile switching center; deducting charge corresponding to the charge number using the MSC or Network Node from account of the user; and delivering the requested service to the user using the solution server, on charging server completing the charge deduction.

Disclosed herein is a system for charging a user in real-time for delivery of on-demand telecommunication services between a first communication network to which the user belongs and a second communication network, the system configured for receiving a service request from the user using a first MSC (Mobile Switching Center) or first Network Node belonging to the first communication network of the user; redirecting the service request to a second MSC or second Network Node belonging to the second communication network using the first MSC (Mobile Switching Center) or first Network Node; redirecting the service request to a solution server using the second MSC or second Network Node, wherein the solution server provides an announcement regarding the services; sending service charging request using the solution server to a charging server, on solution server receiving confirmation from the user for the requested service in response to the announcement; sending charge number corresponding to the requested service using the charging server to the first MSC or first Network Node; deducting charge corresponding to the charge number using the first MSC or first Network Node from account of the user; and delivering the requested service to the user using the solution server, on charging server completing the charge deduction.

Disclosed herein is a system for charging a user in real time by a merchant for delivery of a service using a communication network, the system configured for redirecting the request to a solution server using the merchant through at least one of an application on mobile, Signaling, Wireless Application Protocol (WAP), Web, HTTP, HTTPS, Internet Protocol (TCP/IP), premium SMS and Unstructured Supplementary Service Data (USSD), IVR (Interactive Voice Response), Any Telecommunication Media, Internet Media and so on, on receiving the request from the user for charging a service through an operator; redirecting service charging request using the solution server to a charging server, on said solution server identifying the details of the user for the requested service sending charge number corresponding to the requested service to the MSC (Mobile Switching Center)/ Network Node of the user of the operator using the charging server; deducting charge corresponding to the charge number using the MSC or Network Node from account of the user of the operator; and delivering the requested service to the user using the merchant, on merchant receiving a confirmation from the charging server that the MSC or Network Node has deducted the charge.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which.

DETAILED DESCRIPTION OF EMBODIMENTS

Figure 1:
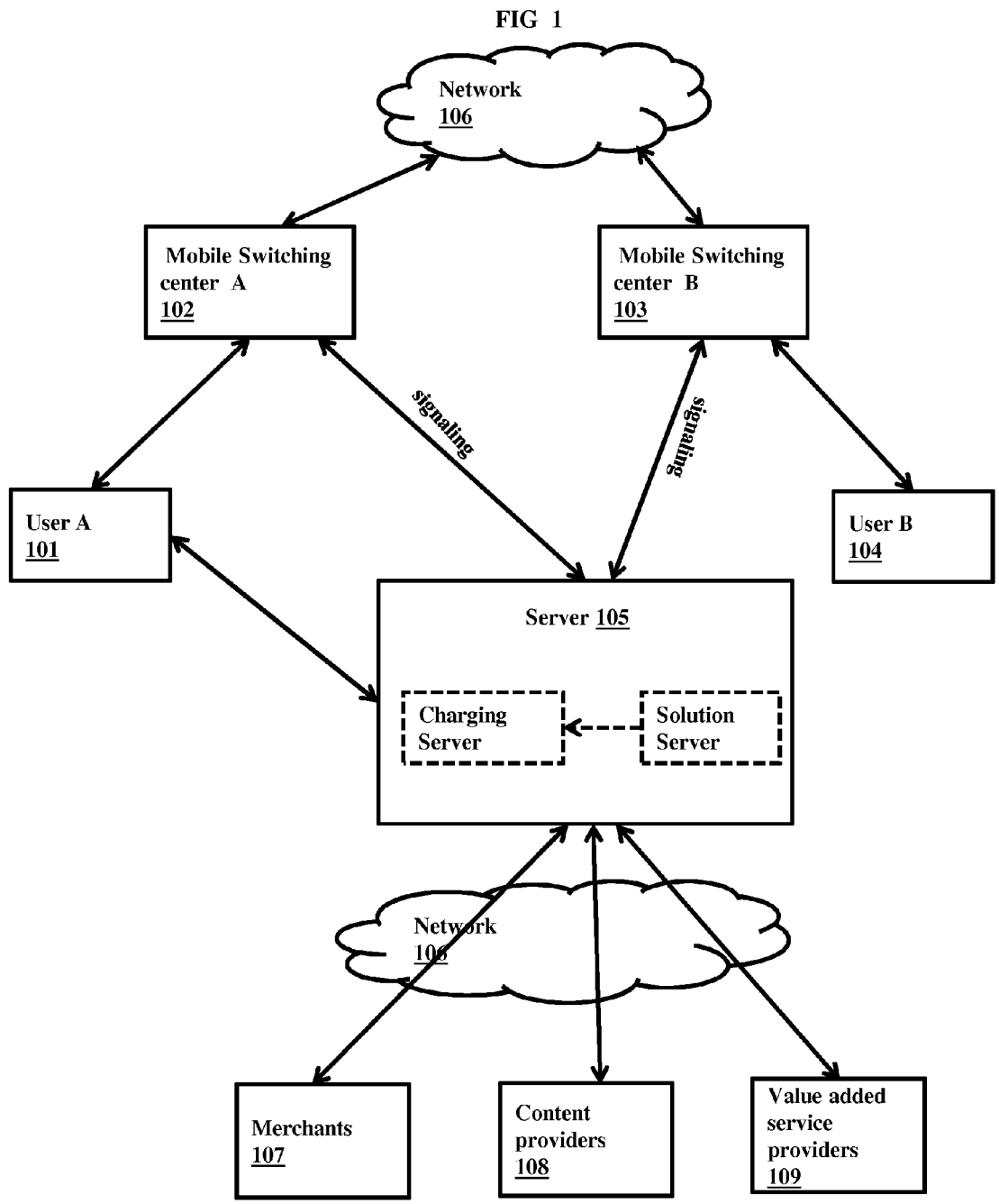
FIG. 1 illustrates a general system for charging a user in real time to deliver On demand services that are associated to an inter network, as disclosed in the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Throughout the disclosure, the terms MSC (mobile switching center) or Network Node are used interchangeably.

The embodiments herein disclose a system and method for charging a user to deliver On demand services. The method of charging a user for providing On demand services comprises obtaining a call attempt or a service request by the mobile network operator or a network node or mobile switching center of the calling party. Then the mobile network operator or network node redirects the call attempt to the corresponding mobile network operator that provides the requested service to the called party. The corresponding network operator transfers the call to a solution server. The solution server generates an announcement to the calling party stating that a variety of premium services are available with each service associated with a unique number and respective charges. For example the solution server announces news service, cricket alerts, astrology service and so on by assigning a unique number to be inputted by the user for accessing these services. For example, the calling party provides a confirmation to avail a particular service by providing Dual Tone Multiple Frequency (DTMF) inputs through Voice input (Biometric), USSD, One time Password (OTP), SMS, Internet Protocol (IP) and so on. Upon the confirmation from the calling party for a particular service, the solution server will send the service charging request to the charging server. Further, the charging server makes a special charge call to the mobile network operator of the calling party through signaling that comprises mobile number of the calling party along with charge number.

The Mobile Switching Center or a Network Node of the calling party identifies the charge number and process the charging request in coordination with charging server and operator billing server. Charge is deducted by the network operator of the calling party according to the type of the user. The mobile switching center or network node of the calling party deducts the charge according to the type of the subscriber using the standard charging mechanism for prepaid and post paid subscribers. Further, the charging server informs the solution server to deliver the requested service to the user, once the charging for requested service is completed. Referring now to the drawings, and more particularly to FIGS. 1 through 7, where similar reference characters denote corresponding features consistently throughout the figures, there are shown embodiments.

FIG. 1 illustrates a system for charging a user in real time to deliver On demand services that are associated to an inter network as disclosed in embodiments herein. As depicted in the figure, the system 100 comprises a calling party 101 (User A) for making a call attempt to request a desired service. The system comprises user A 101, user B 104, a mobile switching center A 102, a mobile switching center B 103 and a server 105. The network 106 may be a wired telephony network, a wireless network, a voice call network, a signaling system number 7 (SS7) network, an internet protocol data network, and other data networks and so on. Further, as shown in FIG. 1, merchants 107, content providers 108, value added service providers 109 and so on are connected to the server 105 through a network 106. The charging server present within the server 105 acts as a central entity that connects a variety of service providers including but not limited to a group of merchants 107, content providers 108 and value added service providers 109 for delivering On demand services to the users. The method of charging a user to deliver On demand services that are associated to an inter network is as described herein.

When user A 101 wants access a service that has been provided by other network operator, which is the mobile switching center B 103. The user has to make a call to a specific number that has been provided by the corresponding network operator that provides the service to user A 101 with a communication device, The communication device of the user A 101 connects to the mobile switching center A 102. The communication device may be a mobile phone, a laptop, a personal digital assistant (PDA), a tablet computing device and so on. The mobile switching center A 102 serves the calling party 101 (User A) and receives the call attempt from the calling party 101 (User A). The mobile switching center A 102 routes the call made by the calling party 101 (User A) to an appropriate destination based on a dialed number by User A 101. The mobile switching center A 102 routes the received call attempt to the mobile switching center B 103 for establishing a communication link between the calling party 101 (User A) and the mobile switching center to provide the requested service.

The mobile switching center B 103 redirects the call to the server 105. Once the call reaches the server 105, the solution server within the server 105 plays an announcement to the calling party regarding the services and its respective charges that are available within the network. For example the solution server announces the availability of services such as news service, cricket alerts, astrology service and so on by assigning a unique number to be inputted by the user for accessing these services. The solution server asks for a confirmation from the user A 101 to avail any of the services by pressing DTMF tones, through Voice input (Biometric), USSD, One time Password (OTP), SMS, Internet Protocol (IP) and so on.

If the calling party 101 is interested in availing a particular service, the calling party 101 confirms for a particular service by pressing DTMF tones through Voice Input (Biometric), Unstructured Supplementary Service Data (USSD), One time Password (OTP), SMS, Internet Protocol (IP) and so on. Upon receiving the confirmation from the calling party 101, the solution server will send the service charging request to the charging server. Further, the charging server makes a special charge call with signaling that comprises calling party's number and the charge number to the mobile switching center A 102 through signaling using signal system number (SS7) protocol. The calling party's 101 mobile switching center A 102 identifies the charge number that is present within the signaling message and processes the charge request along with the charging server following the call completion process.

The mobile switching center 102 of the calling party deducts the balance according to the type of the subscriber using the standard charging mechanism for prepaid and post paid subscribers.

The method of charging (for both prepaid and post paid subscribers) and providing the service happens while the call is still connected. In an embodiment, the server 105 provides one or more services, for example, voice short message services (VSMS), voicemail services, emergency services, non-voice services, etc. Further, the charging criteria comprises, for example, one or more of event based criteria, time duration based criteria, a charging limit defined by the charging server, state of the call attempt, number of services utilized by the calling party 101, type of services utilized by the calling party, etc., or any combination thereof. In an embodiment, the charging application within the charging server determines the charge for the calling party based on one or more of the charging criteria.

Further, the mechanism of charge deduction is also backward compatible as described herein. when User B 104 wants to access the services that are provided by the mobile network operator of User A, the same method of charge deduction can be applicable. In this case the charging server within the server 105 sends the signaling message to mobile switching center 103 that comprises the mobile number of the User B 104 and a charge number. In this way the mechanism is backward compatible for delivering the On demand services across different networks (Inter networks).

In one embodiment, the method provides On demand telecommunication services to the subscribers. The subscribers have the provision to pay for the services whenever they need. In another embodiment, the subscribers can avail the above mentioned telecommunication services depending on their need. Further, the method of providing On demand telecommunication services can be extended to provide other services like GPRS, MMS, News alerts and so on.

In another embodiment, the real time charging mechanism or method is applicable in intra network scenario as well i.e., the telecommunication services can be provided to the users who are connected on same network operator and on the other hand the method is also applicable to the subscribers who are using different network operators (Inter network scenario).

Further, an instant charge deduction happens for prepaid subscribers and an amount of charge will be posted for post paid subscribers. In various embodiments, the charge deduction may be fixed or variable according to the type of the service provided to the subscribers. Further, the amount of charge deducted from the calling party 101 can be varied according to the parameters defined by the server 105. These parameters may include time, quality of service and so on. The services provided to the subscribers or calling party 101 are confined to the network operator of the calling party 101. In an embodiment, when the network operators opens its exclusive content/services to other operator network subscribers, they need to register with charging server to deliver On demand services.

In an embodiment, the real time charging server may be able to authenticate the calling party 101 before performing charge deduction. The charging for providing the desired service involves verifying the credentials of the calling party 101 with the help of home location register (HLR) which exists within the network 106. Further, the server 105 acts as a communication platform that communicates with the network operators or mobile switching centers and delivers the desired services to the subscribers.

In one embodiment the server 105 may use a suitable communication protocol such as SS7 protocol to communicate with MSCs of the user devices. Further, the server 105 may communicate with the mobile switching centers through signaling and uses a variety of protocols including but not limited to standard signal systems number 7 (SS7) protocol.

Figure 2:
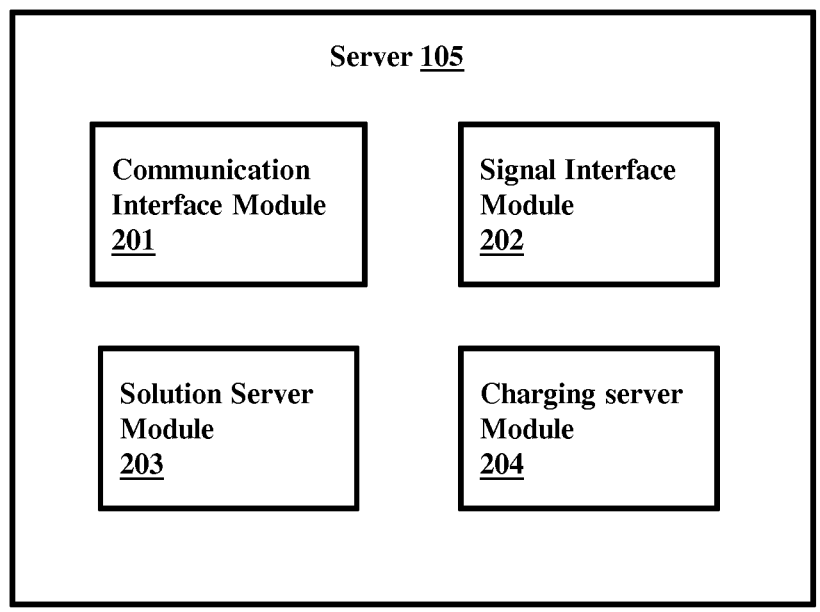
FIG. 2 illustrates the block diagram depicting the modules in the server, as disclosed in the embodiments herein.

FIG. 2 illustrates the block diagram depicting the modules in the server as disclosed in the embodiments herein. As depicted in the figure, the server 105 comprises a communication interface module 201, a signal interface module 202, a solution server module 203, and a charging server module 204. The communication interface module 201 communicates with the network operators through signaling communication using a variety of protocols. In one embodiment, the server 105 communicates through the communication interface module 201 using signal system number 7 (SS7) protocol. The signal interface module 202 helps the server to achieve signaling communication with the network operators. In one embodiment, the sever 105 may be connected to many network operators for providing different telecommunication services to the subscribers. The network operators, may provide premium services such as Voice sms and content services and so on to the subscribers, who are connected to same network (intra network) or any other network (inter network).

The solution server module 203 receives the request from the mobile switching center of the calling party. The solution server 203 plays an announcement to the calling party 101 related to the available services of the network. The solution server module 203 requests a confirmation from the calling party to provide the services that are available in the network. Upon the confirmation from calling party, the solution server module 203 processes the charge request through the charging server module 203.

Figure 3:
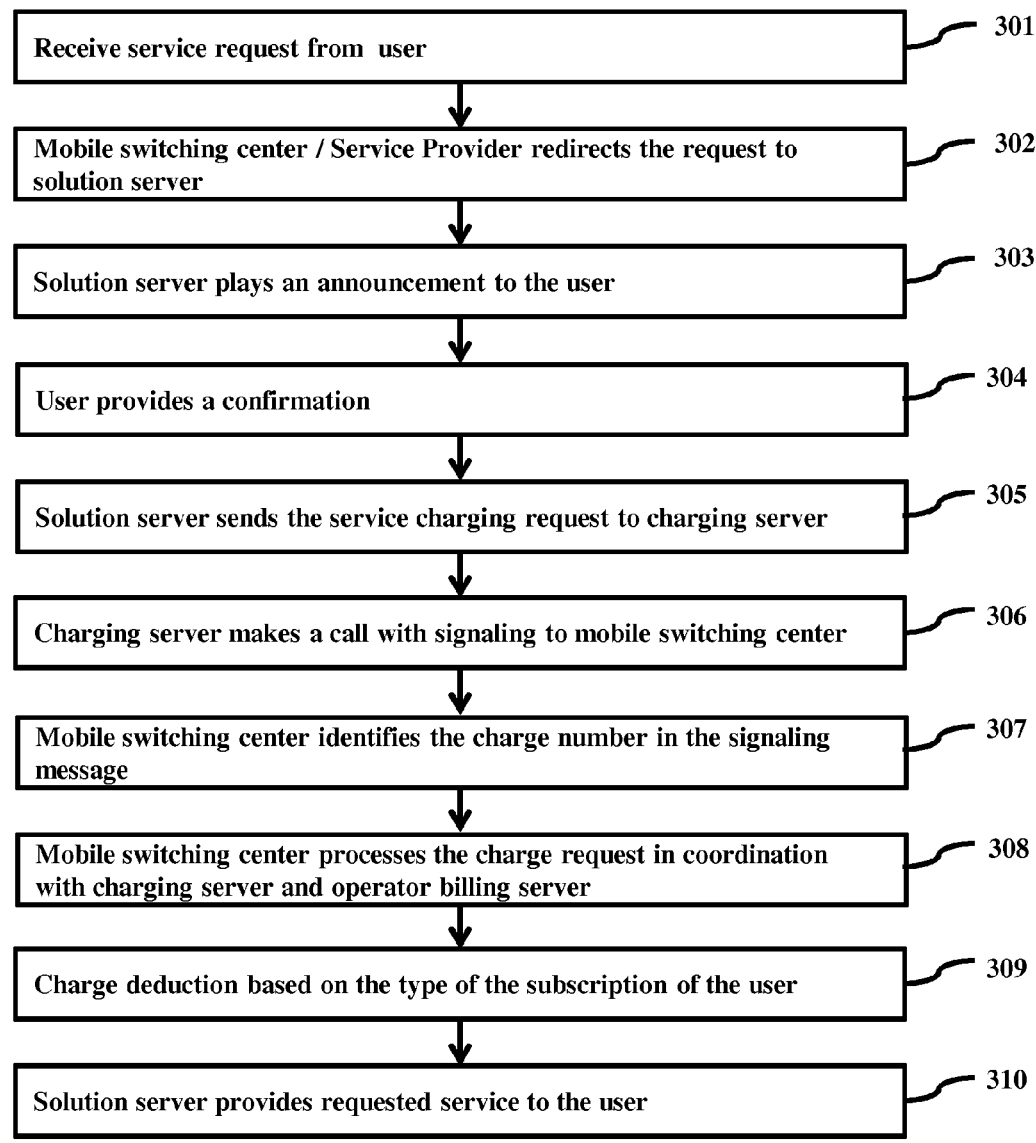
FIG. 3 is a flow diagram which depicts the various steps involved in charging the user in real time to deliver On demand services within an intra network, as disclosed in the embodiments herein.

FIG. 3 is a flow diagram which depicts the various steps involved in charging the user in real time to deliver On demand services within an intra network as disclosed in the embodiments herein. Initially, the user requests (301) for a particular service. The user can request for a service using a numeric or alphanumeric and so on that has been defined by the network operator of the user. This number can be a toll free number or a published number, wherein the user is not charged by the operator for requesting a particular service. This request reaches corresponding MSC (Mobile Switching Center) or network node of the service provider. Further, the mobile switching center or the network node of the user redirects (302) the request to a solution server. The solution server plays (303) an announcement to the user regarding the availability of the services within the network. In one embodiment solution server provides an announcement to the user regarding all the available services, for example the solution server announces news service, cricket alerts, astrology service and so on by assigning a unique number to be inputted by the user for accessing these services. Further, solution server asks for a confirmation by inputting a corresponding number which is associated with the service to provide the service to the user. The user provides (304) a confirmation to avail the requested service by inputting a number which is associated with the service. In an embodiment, the user provides the confirmation to the requested service by pressing Dual Tone Multiple Frequency (DTMF) inputs through Voice Input (Biometric), USSD, One Time Password (OTP) SMS, Internet Protocol (IP) and so on. The solution server receives the confirmation from the user for a particular service and the solution server sends (305) the service charging request to the charging server. Further, the charging server makes (306) a special charge call with signaling that comprises the mobile number of the user and a charge number to the mobile switching center of the user.

The mobile switching center of the user identifies (307) the charge number that is present within the signaling message and processes (308) the charging request in coordination with charging server and operator billing server.

The mobile switching center of the user charges (309) according to the type of the subscriber using the standard charging mechanism for prepaid and post paid subscribers.

The solution server provides (310) the requested service to the user once the charging for the request is completed. Further, the above mentioned steps will be performed by the method while the call is still connected. Further, the charge deduction can be fixed or variable depending on the time interval that has been preset by the network operator of the user. The charge deduction is varied according to the type of the service requested by the user and also depends on the time interval for which the user has availed a particular service. The various actions in method 300 may be performed in the order presented, in a different order or simultaneously. Further, in some embodiments, some actions listed in FIG. 3 may be omitted.

Figure 4:
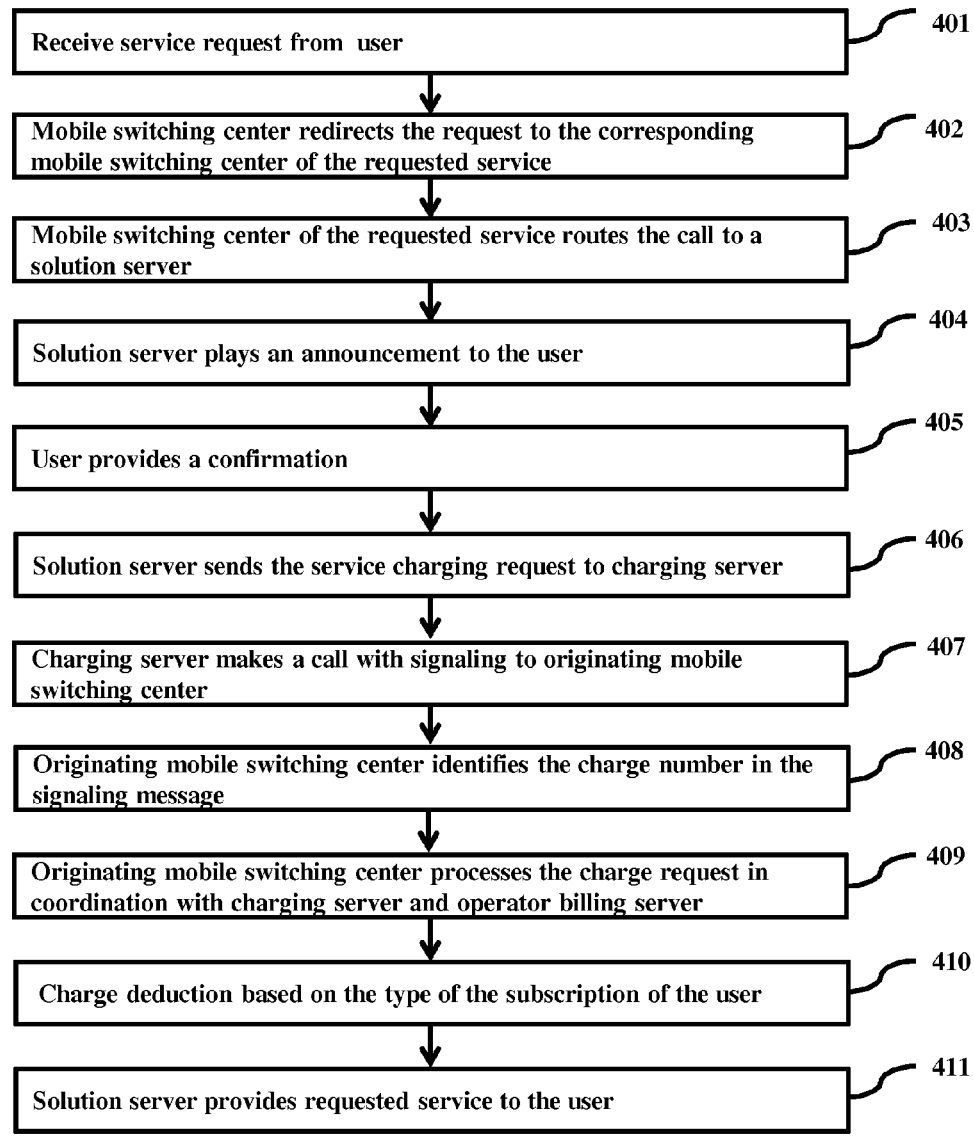
FIG. 4 is a flow diagram which depicts the various steps involved in process of charging the user in real time to deliver On demand services in an inter network scenario, as disclosed in the embodiments herein.

FIG. 4 is a flow diagram which depicts the various steps involved in charging the user in real time to deliver On demand services in an inter network scenario as disclosed in the embodiments herein. As described in the FIG. 400, the method of charging the user in real time, when the user is trying to access a particular service which belongs to an inter network will remains to be the same as the method that has been described for intra network, except the fact that there exists two mobile switching centers or network nodes within the mechanism. Further, the method of charging the user for accessing the inter network services has been disclosed herein.

The method receives (401) a service request from a user. The mobile switching center or first network node of the user receives the service request form the user. The mobile switching center or first network node of the user redirects (402) the request to the corresponding mobile switching center or a second network node of the requested service. In an embodiment, the user can request the service by reaching numeric, alpha numeric and so on for availing the service. This numeric, alpha numeric and so on can be toll free number or alpha numeric or a published number as assigned by the network operator or mobile switching center that has been serving the request to the user. The mobile switching center or second network node, that has been intended to serve the request of the user routes (403) the request to a solution server.

The solution server plays (404) an announcement to the user regarding the availability of the services and its respective charges within the network. In one embodiment solution server provides an announcement to the user regarding all the services that are available within the network, for example the solution server announces news service, cricket alerts, astrology service and so on by assigning a unique number or alpha numeric and so on to be inputted by the user for accessing these services. Further, solution server asks for a confirmation by inputting a corresponding number which is associated with the service to provide the service to the user. The user provides (405) a confirmation to avail the requested service by inputting a number which is associated with the service. In an embodiment, the user provides the confirmation to the requested service by pressing Dual Tone Multiple Frequency (DTMF) inputs through Voice Input (Biometric), USSD, One Time Password (OTP) SMS, Internet Protocol (IP) and so on. The solution server receives the confirmation from the user for a particular service and the solution server sends (406) the service charging request to the charging server. Further, the charging server makes (407) a special charge call with signaling that comprises the mobile number of the user and a charge number to the originating mobile switching center or a first network node of the user.

The originating mobile switching center or first network node identifies (408) the charge number that is present within the signaling message and processes (409) the charging request in coordination with charging server and operator billing server.

The mobile switching center or first network node of the user charges (410) according to the type of the subscriber using the standard charging mechanism for prepaid and post paid subscribers.

The solution server provides (411) the requested service to the user once the charging for the request is completed. Further, the above mentioned steps will be performed by the method while the call is still connected. Further, the charge deduction can be fixed or variable depending on the time interval that has been preset by the network operator of the user. The charge deduction is varied according to the type of the service requested by the user and also depends on the time interval for which the user has availed a particular service.

In an embodiment, the charge number in the signaling message contains a unique address for a node (Signaling Point, or SP). The various actions in method 400 may be performed in the order presented, in a different order or simultaneously. Further, in some embodiments, some actions listed in FIG. 4 may be omitted.

Figure 5:
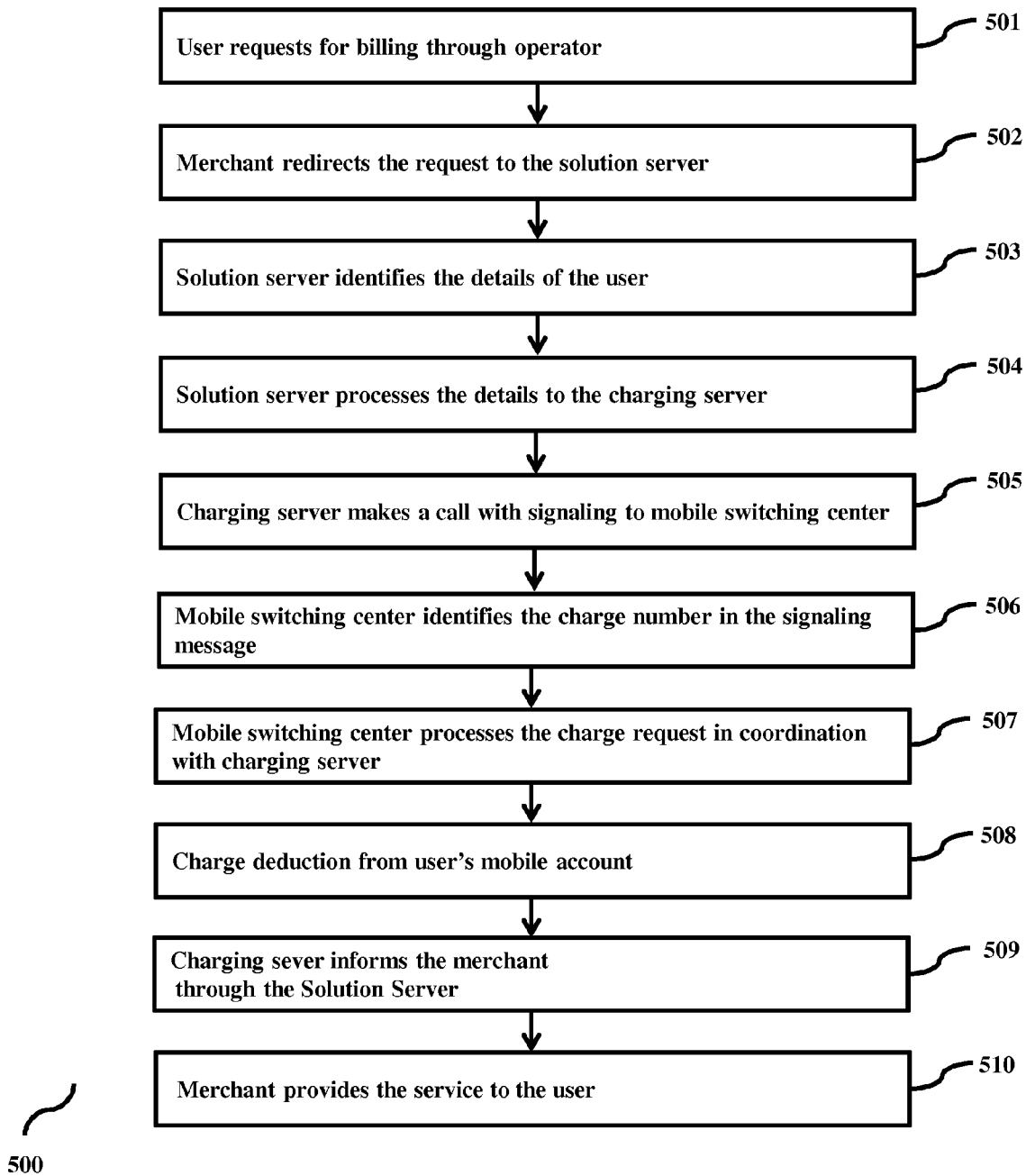
FIG. 5 is a flow diagram which depicts the various steps involved in process of charging the user in real time by a merchant to deliver the desired service, as disclosed in the embodiments herein.

FIG. 5 is a flow diagram which depicts the various steps involved in charging the user in real time by a merchant to deliver the desired service as disclosed in the embodiments herein. The mechanism of billing the user by a merchant involves paying the desired amount for the requested service to the merchant through mobile payment. In one embodiment paying through mobile payment involves charging the user through mobile account. The user can request a service from merchant using mobile payments through an application on mobile, Internet Protocol (IP), Wireless Application Protocol (WAP), premium sms, Unstructured Supplementary Service Data (USSD) and so on. Initially the method receives (501) a request from the user. The request from the user is for charging the user by the operator. In other words, the user prefers to pay through operator. This mechanism is known as Direct Operator Billing (DOB), which involves billing of the user by the operator. The process of charging the user by the merchant is as described herein with an example as stated below.

The user has requested a purchase through a portal. In one embodiment the portal can be an E-commerce portal, M-commerce portal, G-commerce portal and the like. The user wishes to pay the amount for the desired goods through Direct Operator Billing (DOB). The process of purchasing goods through a portal can be through a mobile application also. The user selects Direct Operator Billing for payment to purchase goods, services and so on. The merchant redirects (502) the request to a solution Server. The solution server identifies (503) the details of the user. The identification details by the solution server may include the network operator of the user and the amount that has been requested by the user to pay through Direct Operator Billing and other parameters. Once the solution server identifies the details of the user, the solution server processes (504) the same details to a charging server. Further, the charging server makes (505) a special call to the mobile switching center with signaling which comprises mobile number of the user along with charge number.

In an embodiment, the charge number in the signaling message contains a unique address for a node (Signaling Point, or SP).

The mobile switching center of the user identifies (506) the charge number within the signaling message and processes (507) the charge request in coordination with the charging server. The charge will be deducted (508) from the user's mobile account and the charging server informs (509) the merchant through solution server regarding the deduction of charge from user's mobile account and the merchant provides (510) the service to the user. In this way the mechanism of charging the user in real time to provide the desired service can be extended to various other merchant services.

In an embodiment charging server may act as a central entity which is connected to plurality of merchants and/or communication servers. The charge deduction will be recorded in the charging server for every transaction that the user has made through Operator Billing. The type of merchants connected to the charging server can be any of the type that comprises e-commerce, m-commerce, G-commerce, e-governance, mobile wallet or mobile money operators, store value accounts and so on.

Further, the e-commerce portal may be a shopping websites like eBay, Amazon, Flip kart and so on. The m-commerce portals or applications as described in the method may include payment through mobile application, banking, ticketing and so on. The described method herein can also be extended to e governance portals which provide a government interaction with the citizens, exchange of information communication transactions, integration various stand-alone systems and services between Government-to-Citizens (G2C), Government-to-Business (G2B), Government-to-Government (G2G) as well as back office processes and interactions within the entire government frame work. Further, the mechanism of charging the user in real time by merchant using mobile money can also be extended to G-commerce transactions and so on.

The type of merchants that are connected to charging server to deliver the services to the subscribers can be any of the above mentioned type. Finally these merchant accounts will be settled according to the transactions that has been recorded within the charging server, which integrates all the merchants to deliver the services in real time to the users or subscribers.

Further, the merchants integrated with the charging server also comprises mobile subscribers, vendors, banks, operators, content owners and aggregators, social network operators, television and game show providers and other cloud service providers. The various actions in method 500 may be performed in the order presented, in a different order or simultaneously. Further, in some embodiments, some actions listed in FIG. 5 may be omitted.

Figure 6:
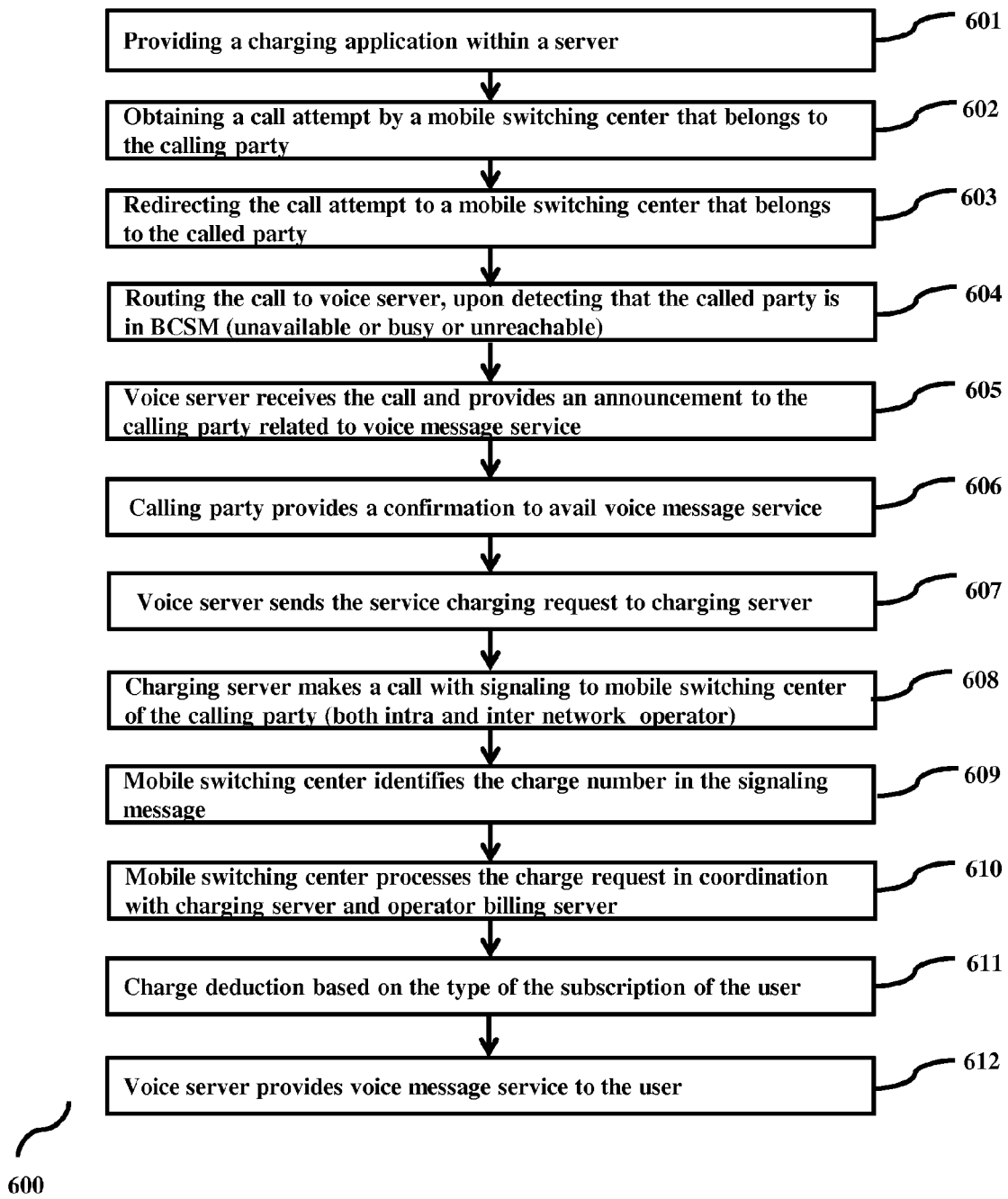
FIG. 6 is an example flow diagram which depicts various steps involved in the process of implementing the real time charging mechanism to deliver a voice message service, as disclosed in the embodiments herein.

FIG. 6 is an example flow diagram which depicts various steps involved in the process of charging a user in real time to deliver a voice message service, as disclosed in the embodiments herein. The method provides (601) an instant charging application within a server. The mobile switching center obtains (602) a call attempt from the calling party. The mobile switching center redirects (603) the call to the corresponding mobile switching center of the called party. In case the called party is found in any of the instances such as busy, unreachable, unavailable and so on. The mobile switching center routes (604) the call to the voice server, upon detecting that the called party is in basic call state model (BCSM) (which indicates that the calling party is unavailable or busy or unreachable) for providing voice message service to the calling party. The voice server receives (605) the call and generates an announcement to the calling party about the availability of a voice message service and its respective charges. The calling party, upon hearing the announcement, makes (606) a confirmation for availing the voice message service. In an embodiment, the user provides the confirmation to the requested service by pressing Dual Tone Multiple Frequency (DTMF) inputs. Upon accepting the confirmation from the calling party, the voice server sends (607) the service charging request to the charging server. Further, the charging server makes (608) a special charge call with signaling, which comprises the calling party number and the charge number to the mobile switching center of the calling party for deducting the charge.

The mobile switching center of the calling party identifies (609) the charge number that is present within the signaling message and processes (610) the charging request in coordination with charging server and operator billing server.

The mobile switching center of the calling party deducts (611) the charge according to the type of the subscriber using the standard charging mechanism for prepaid and post paid subscribers. The solution server provides (611) the requested voice message service to the user once the charging for the request is completed. The calling party can leave a voice message to the called party once the charge deduction is completed. In this way the mechanism of charging the user in real time for delivering a voice message service can be implemented with or without terminating the call by the calling party to avail the voice message service.

In an embodiment, the charge number in the signaling message contains a unique address for a node (Signaling Point, or SP). The various actions in method 600 may be performed in the order presented, in a different order or simultaneously. Further, in some embodiments, some actions listed in FIG. 6 may be omitted.

The charging application residing on the charging server provides the service instantly by deducting the appropriate amount of charge for the service with or without terminating the call. An instant charge deduction happens in case of prepaid and appropriate amount of charge will be posted in case of post paid subscribers. In various embodiments, the charging application may support charging mechanism within same network (intra network) and among different networks (inter networks).

In one embodiment, the charging server acts as a central hub or entity where all the network operators, merchants, content providers and aggregators are connected to it and can provide On demand telecommunication services to the subscribers by instantly deducting the charge on the call. Further, live call charge deduction takes place and the desired service is provided to subscriber depending on the calling party's request.

In another embodiment, the charge deduction for providing the service can be fixed or variable which depends on the attributes like event or time duration or type of service or quality of service, which depends on the network operators and the like.

In an embodiment, the above mentioned method can also be extended for money transfer services among same networks, which is being used in our day-to-day life for crediting the payments according to the subscribers requirement. Further, these money transfer services can also be implemented among the subscribers who are connected on different networks (money transfer can be done from one subscriber on a network to a merchant or subscriber on a different network) and finally the merchant accounts can be settled accordingly.

For example, when subscriber of a first mobile network (user 1) wants to make a payment for an item purchased to a merchant associated to a second mobile network (user 2) through his mobile account, the mechanism of charging the user 1 can be done using a charging server, which acts as central entity among them. The charging server acts a central entity between the merchant associated to a second mobile network and the subscriber of a first mobile network for money transfer services between them. The charge deduction for the requested payment from the mobile account of subscriber of first mobile network will be recorded within the charging server.

In an embodiment, the merchant on a second mobile network can be a subscriber on the second mobile network. In this way, the money transfer services among the subscribers belonging to different network operators can be implemented by using the same mechanism where the subscribers can exchange money with a centralized charging server.

Figure 7:
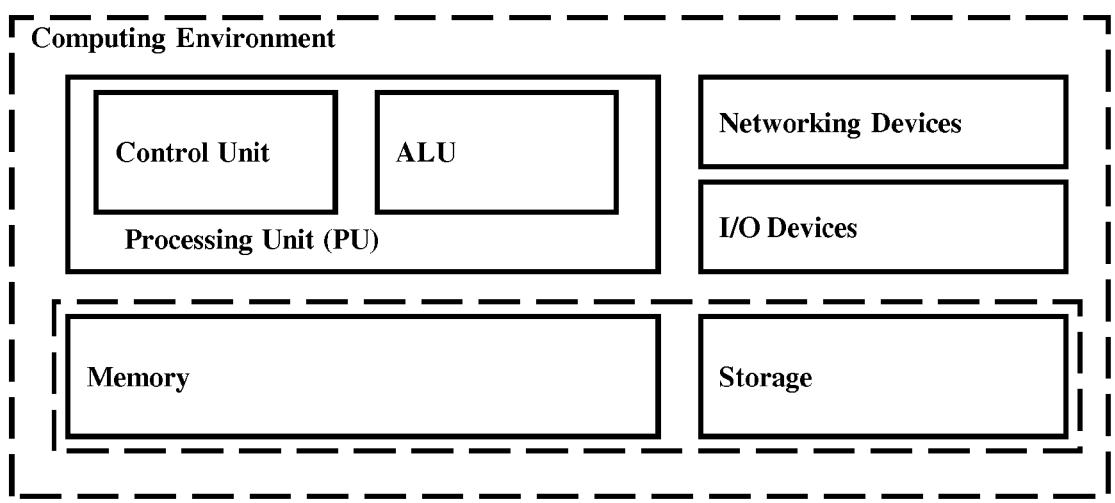
FIG. 7 illustrates a computing environment implementing the real time charging mechanism, as disclosed in the embodiments herein.

FIG. 7 illustrates a computing environment implementing the charging application as disclosed in the embodiments herein. As depicted the computing environment 701 comprises at least one processing unit 704 that is equipped with a control unit 702 and an Arithmetic Logic Unit (ALU) 703, a memory 705, a storage unit 706, plurality of networking devices 708 and a plurality Input output (I/O) devices 707. The processing unit 704 is responsible for processing the instructions of the algorithm. The processing unit 704 receives commands from the control unit in order to perform its processing. Further, any logical and arithmetic operations involved in the execution of the instructions are computed with the help of the ALU 703.

The overall computing environment 701 can be composed of multiple homogeneous and/or heterogeneous cores, multiple CPUs of different kinds, special media and other accelerators. The processing unit 704 is responsible for processing the instructions of the algorithm. Further, the plurality of processing units 704 may be located on a single chip or over multiple chips.

The algorithm comprising of instructions and codes required for the implementation are stored in either the memory unit 705 or the storage 706 or both. At the time of execution, the instructions may be fetched from the corresponding memory 705 and/or storage 706, and executed by the processing unit 704.

In case of any hardware implementations various networking devices 708 or external I/O devices 707 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1, 2 and 7 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

I claim:

1. A method of charging a user in real-time for delivery of on-demand telecommunication services within a communication network to which said user belongs, wherein said method comprises:
   redirecting said service request to a solution server by at least one of a MSC (Mobile Switching Center) or a Network Node, on said MSC (Mobile Switching Center) or said Network Node receiving a service request from said user, wherein said solution server provides an announcement regarding said services,
   sending service charging request by said solution server to a charging server, on said solution server receiving confirmation from said user for said requested service in response to said announcement,
   sending charge number corresponding to said requested service by said charging server to said MSC (Mobile Switching Center) or said Network Node,
   deducting charge corresponding to said charge number by said MSC (Mobile Switching Center) or said Network Node from account of said user; and
   delivering said requested service to said user by said solution server, on said charging server completing charge deduction.

2. The method as in claim 1, wherein said charging server sends said charge number to at least one of said MSC (Mobile Switching Center) or said Network Node through signaling.

3. The method as in claim 1, wherein said charge is one of fixed charge and variable charge, wherein said charge is preset by said MSC or said Network Node of said user.

4. The method as in claim 1, wherein said user is one of a prepaid subscriber and a postpaid subscriber.

5. A method of charging a user in real-time for delivery of on-demand telecommunication services between a first communication network to which said user belongs and a second communication network, wherein said method comprises:
   receiving a service request from said user by at least one of a first MSC (Mobile Switching Center) or a first Network Node belonging to said first communication network of said user,
   redirecting said service request to a second MSC (Mobile Switching Center) or a second Network Node belonging to said second communication network by said first MSC (Mobile Switching Center) or said first Network Node;
   redirecting said service request to a solution server by said second MSC (Mobile Switching Center) or said second Network Node, wherein said solution server provides an announcement regarding said services;
   sending service charging request by said solution server to a charging server, on said solution server receiving confirmation from said user for said requested service in response to said announcement;
   sending charge number corresponding to said requested service by said charging server to said first MSC (Mobile Switching Center) or said first Network Node;
   deducting charge corresponding to said charge number by said first MSC (Mobile Switching Center) or said first Network Node from account of said user, and
   delivering said requested service to said user by said solution server, on said charging server completing the charge deduction.

6. The method as in claim 5, wherein said charging server sends said charge number to at least one of said first MSC (Mobile Switching Center) or said first Network Node through signaling.

7. The method as in claim 5, wherein said charge is one of fixed charge and variable charge, wherein said charge is preset by said MSC or said Network Node of said user.

8. The method as in claim 5, wherein said user is one of a prepaid subscriber and a postpaid subscriber.

9. A method of charging a user in real time by a merchant for delivery of a service using a communication network, wherein said method comprises:
   receiving a request from said user for charging a service through an operator,
   redirecting said request to a solution server by a merchant server,
   redirecting said service charging request by said solution server to a charging server, on said solution server identifying the details of said user for said requested service;
   sending charge number corresponding to said requested service to at least one of a MSC (Mobile Switching Center) or a Network Node of said user of said operator by said charging server;
   deducting charge corresponding to said charge number by said MSC (Mobile Switching Center) or said Network Node from account of said user of said operator, and
   delivering said requested service to said user by said merchant server, on said merchant server receiving a confirmation from said charging server that said MSC (Mobile Switching Center) or said Network Node has deducted said charge.

10. The method as claimed in claim 9, wherein said redirecting of said request to said solution server by said merchant server is performed through a medium comprising of a mobile application, Signaling, Wireless Application Protocol (WAP), Web, HTTP, HTTPS, Internet Protocol (TCP/IP), premium SMS and Unstructured Supplementary Service Data (USSD), IVR (Interactive Voice Response), any Telecommunication Media and Internet Media.

11. The method as in claim 9, wherein said identification details of said user comprise at least one of a mobile number of said user and network operator of said user and amount that the user has requested for said service.

12. The method as in claim 9, wherein said charging server sends said charge number to at least one of a said MSC (Mobile Switching Center) or said Network Node through signaling.

13. A system for charging a user in real-time for delivery of on-demand telecommunication services within a communication network to which said user belongs, said system provided with at least one means configured for:
   redirecting said service request to a solution server using at least one of a MSC (Mobile Switching Center) or a Network Node, on said MSC (Mobile Switching Center) or said Network Node receiving a service request from said user, wherein said solution server provides an announcement regarding said services;

sending service charging request using said solution server to a charging server, on said solution server receiving confirmation from said user for said requested service in response to said announcement;

sending charge number corresponding to said requested service using said charging server to said mobile switching center or said Network Node;

deducting charge corresponding to said charge number using said MSC (Mobile Switching Center) or said Network Node from account of said user; and delivering said requested service to said user using said solution server, on said charging server completing the charge deduction.

14. The system as in claim 13, wherein said charging server is configured for sending said charge number to said MSC (Mobile Switching Center) or said Network Node through signaling.

15. The system as in claim 13, wherein said charge is one of fixed charge and variable charge, wherein said charge is pre-set by said MSC or said Network Node of said user.

16. The system as in claim 13, wherein said user is one of a prepaid subscriber and a postpaid subscriber.

17. The system for charging a user in real-time for delivery of on-demand telecommunication services between a first communication network to which said user belongs and a second communication network, said system provided with at least one means configured for:

receiving a service request from said user using at least one of a first MSC (Mobile Switching Center) or a first Network Node belonging to said first communication network of said user;

redirecting said service request to a second MSC (Mobile Switching Center) or said second Network Node belonging to said second communication network using said first MSC (Mobile Switching Center);

redirecting said service request to a solution server using said second MSC (Mobile Switching Center) or said second Network Node, wherein said solution server provides an announcement regarding said services;

sending service charging request using said solution server to a charging server, on said solution server receiving confirmation from said user for said requested service in response to said announcement;

sending charge number corresponding to said requested service using said charging server to said first MSC (Mobile Switching Center) or said first Network Node;

deducting charge corresponding to said charge number using said first MSC (Mobile Switching Center) or said first Network Node from account of said user; and delivering said requested service to said user using said solution server, on said charging server completing charge deduction.

18. The system as in claim 17, wherein said charging server is configured for sending said charge number to said first MSC (Mobile Switching Center) or said Network Node through signaling.

19. The system as in claim 17, wherein said charge is one of fixed charge and variable charge, wherein said charge is pre-set by said MSC or said Network Node of said user.

20. The system as in claim 17, wherein said user is one of a prepaid subscriber and a postpaid subscriber.

21. A system for charging a user in real time by a merchant for delivery of a service using a communication network, said system provided with at least one means configured for:

receiving a request from said user for charging a service through an operator;

redirecting said request to a solution server by a merchant-server;

redirecting said service charging request by said solution server to a charging server, on said solution server identifying the details of said user for said requested service;

sending charge number corresponding to said requested service to at least one of a MSC (Mobile Switching Center) or a Network Node of said user of said operator using said charging server;

deducting charge corresponding to said charge number using said MSC (Mobile Switching Center) or said Network Node from account of said user of said operator; and delivering said requested service to said user using said merchant, on said merchant receiving a confirmation from said charging server that said MSC (Mobile Switching Center) or said Network Node has deducted said charge.

22. The system as claimed in claim 21, wherein said redirecting of said request to said solution server by said merchant server is performed through a medium comprising of a mobile application, Signaling, Wireless Application Protocol (WAP), Web, HTTP, HTTPS, Internet Protocol (TCP/IP), premium SMS and Unstructured Supplementary Service Data (USSD), IVR (Interactive Voice Response), any Telecommunication Media and Internet Media.

23. The system as in claim 21, wherein said identification details of said user comprise at least one of a mobile number of said user and network operator of said user and amount that the user has requested for said service.

24. The system as in claim 21, wherein said charging server is configured for sending said charge number to at least one of said MSC (Mobile Switching Center) or said Network Node through signaling.

* * * * *